(12) United States Patent
Smith

(10) Patent No.: US 8,612,307 B2
(45) Date of Patent: Dec. 17, 2013

(54) SYSTEM AND METHOD TO PRICE AND EXCHANGE DATA PRODUCERS AND DATA CONSUMERS THROUGH FORMATTING DATA OBJECTS WITH NECESSARY AND SUFFICIENT ITEM DEFINITION INFORMATION

(75) Inventor: Stanley Benjamin Smith, Fort Mill, SC (US)

(73) Assignee: Stanley Benjamin smith, Charlotte, NC (US)

( * ) Notice: Subject to any disclaimer, the term of this patent is extended or adjusted under 35 U.S.C. 154(b) by 386 days.

(21) Appl. No.: 13/135,420

(22) Filed: Jul. 5, 2011

(65) Prior Publication Data

US 2012/0173355 A1 Jul. 5, 2012

Related U.S. Application Data

(63) Continuation-in-part of application No. 12/930,280, filed on Jan. 3, 2011, now Pat. No. 8,510,176.

(51) Int. Cl.
*G06Q 30/00* (2012.01)
(52) U.S. Cl.
USPC .................. 705/26.5; 705/27.1; 705/26.1
(58) Field of Classification Search
USPC ................................................ 705/26, 27
See application file for complete search history.

(56) References Cited

U.S. PATENT DOCUMENTS

| 6,490,601 | B1 * | 12/2002 | Markus et al. | 715/207 |
|---|---|---|---|---|
| 7,630,986 | B1 * | 12/2009 | Herz et al. | 1/1 |
| 7,953,696 | B2 * | 5/2011 | Davis et al. | 707/608 |
| 2006/0015435 | A1 * | 1/2006 | Nathanson | 705/37 |
| 2006/0167907 | A1 * | 7/2006 | Jones | 707/100 |
| 2006/0206412 | A1 * | 9/2006 | Van Luchene et al. | 705/37 |
| 2009/0254971 | A1 * | 10/2009 | Herz et al. | 726/1 |
| 2010/0153278 | A1 * | 6/2010 | Farsedakis | 705/80 |

OTHER PUBLICATIONS

Business Wire: "Jigsaw Sets Data Free: Launches Open Data Initiative with the Support of Top CRM and Contact Management Providers Including NetSuite, Oracle, Sage, . . . " Jun. 4, 2008; Dialog file 610 #0001949771, 3pgs.*
Business Wire 2: "SugarCRM Announces Support of Jigsaw's Open Data Initiative," Jun. 4, 2008; Dialog file 610 #0001949728, 3pgs.*
Jigsaw Website: Internet Archive Wayback Machine (www.archive.org/jigsaw.com); Jul. 27, 2008; 2pgs.*

* cited by examiner

*Primary Examiner* — Rob Pond

(57) ABSTRACT

The invention provides a method and system to enable buyers and sellers of data items to adjust fees for one or a plurality of data items according to the compatibility of the data items with research and dataset compatibility requirements of the end user or buyer of the data items. It further provides a method for constructing data item pairs consisting of targets for observations and observations upon targets compatible with the requirement of the purchaser of the data.

10 Claims, 1 Drawing Sheet

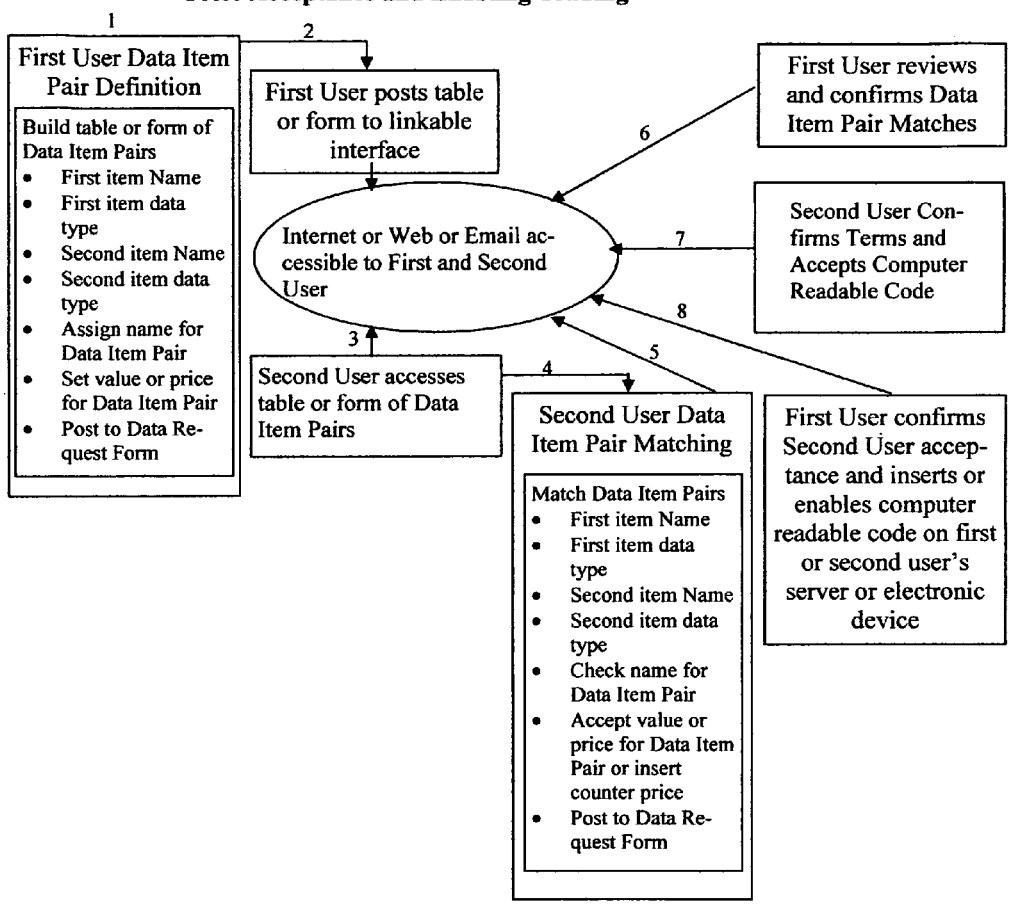
Diagram of Event Sequences—Data Item Pair Creation, Comparison, Price Acceptance and Enabling Trading

SYSTEM AND METHOD TO PRICE AND EXCHANGE DATA PRODUCERS AND DATA CONSUMERS THROUGH FORMATTING DATA OBJECTS WITH NECESSARY AND SUFFICIENT ITEM DEFINITION INFORMATION

This is a Continuation in Part of Ser. No. 12/930,280

BACKGROUND OF THE INVENTION

1. Field of the Invention

This invention relates to systems and methods for setting prices for sale or purchase of data items.

2. Description of the Related Art

Many users of electronic devices create or produce data in the course of their daily work. Some electronic devices also automatically create and log or store data as they perform functions intrinsic to their use and design. A problem for consumers of data, such as data aggregators, federators, data warehouses, researchers, brokers, and resellers results from data producers or the computer readable code implemented on devices housing data or generating data configuring, entering, and storing data in a multiplicity of formats. Incompatible formats require the purchaser or consumer of data to reformat it in order to enable it to be federated or aggregated into a larger dataset for research, analysis, repurposing, or reuse. Because data is stored in many different formats, aggregators and federators of data have attempted to implement data structure standards from the top down to force data producers or creators to accumulate and post data in standardized or preferred formats. Business and professional groups generate a multiplicity of consortia to set data formatting, structuring, tagging and labeling standards. Business groups and national and state agencies lobby legislators and often are able to get legislation in place requiring people and organizations that exchange data to provide the data in specific formats. There are currently hundreds of separate data structure standards for data sources. These "top down" approaches require coordination and regulation and, even when they are well conceived, do not necessarily motivate producers of data to expend the effort to shape their data according to the standard. The time and energy and complexity of processing required to reformat the data, often called "data wrangling" or "data transformation" is both expensive and prone to error. The need to wrangle data reduces the ability of a data warehouse, aggregator or federator to leverage resources and increases the cost of data processing and other uses and applications of data. Data that might be useful for research may never be part of an aggregated or federated dataset due to incompatibility of data formats. Tools and systems that are used to do these transformations or translations are often called "middleware."

For persons who enter, format, configure, collect, post to a dataset or database, distribute, or sell data; undertaking the reformatting and conversion of their data can be a significant hurdle. They will sometimes forego the potential benefit from selling their data to avoid the labor involved in reformatting their data. Some enlist or purchase services from one of the many businesses and consulting firms that have emerged to facilitate the transformation of data into alternate formats. Others will use one or another middleware software program to convert their data into an alternate format. These organizations and software programs function much like foreign language translators or translation tools to translate from one vocabulary and grammar to another. Undertaking a translation of datasets or data items can be similar to undertaking a translation of a document in a foreign language; the resulting translation is prone to contain errors because idioms and dialects and alternate meanings can confuse even native speakers. These data sources are also often converted in their entirety, not only the specific items in the dataset that may have real value to the purchaser. Data producers may need to remove subsets of data from these datasets, particularly if they contain confidential or protected information, adding yet another step into an already tedious process.

Purchasing data should be as simple and easy as purchasing any other commodity, but the issues described above regarding data formatting also create problems for data pricing. The unit of data that is most relevant for the purchaser is as simple as the one or a plurality of questions that he is posing and the one or a plurality of answers to those questions. Intuitively one might believe that queries that access datasets pose a question (query) and the data that is extracted is the answer. However, this is not actually the case. A question may be embedded within a query, but it is obscured in the complexity of query construction. Furthermore, producers and consumers of data are required to possess specialized expertise and knowledge to design and implement queries. The invention described herein will enable pricing of data through a streamlined pairing of data items to facilitate format matching and exchange of data. It will serve to enable a "bottom up" process that rationalizes and facilitates pricing and data exchange.

When a researcher collects data for research, the necessary and sufficient information to enable posting into a dataset for application of research, analysis, or further processing is contained in a pair of data items from a dataset. The first item in the data item pair is the data point or target and the second item in the data item pair is the observation upon the data point or target or object that constitutes the research information. Target plus observation is the universal minimal requirement for utility of shared data. In a research context, one can think of the target data item as the "Question" and the observation data item as the "Answer." In effect, this is the "necessary and sufficient" criteria for rational valuation of data. Data is of value if it provides answers to questions. Pricing for data should fundamentally reflect the value of this paired information; the "question" and the "answer." Other variables that may affect pricing, aside from the importance value and significance of the question are accuracy, rarity, and utility of the answer. These pricing variables, with the paired question and answer, reflect the "supply and demand" equation common to all commodity markets.

Each item in a data item pair has at least two attributes, an object name and a data type. In most instances the data point or target is a text string such as the name of element or the product or the person serving as the target for an observation, whereas the observation often is an integer or value, but may also be a text string or a date or other data type. Within data types are variations that are usually called "masks" that reflect the domain for the data type. For example, the integer data type might represent a number of Dollars or a number of Dimes and therefore the masks might require differing decimal placements. These units are an external or context concern and the domain expert will, in most instances, be aware of the context for the data point that serves as the "Answer." A series of these pairs can readily be shaped through computer readable code for posting into a table or other typical data structure. In the early days of data transfer, this fundamental pairing of the target data item with the observation was stored or posted in simple tables, but the computer readable code that drove data collection began to add layers of complexity to the tables, resulting in databases and so forth. This natural and understandable trend, however, induced ever larger data collections under the assumptions that the producer was also the consumer. For a data exchange market to operate efficiently, the data to be exchanged needs to be as parsimonious and singular as possible for market pricing, to limit the bandwidth required, and to increase the relevance and immediate utility of the data.

The invention herein pairs a question with an answer, or an hypothesis with an experimental observation, or a research target with an observation upon that target to enable two parties to exchange the information and set a value for it.

BRIEF SUMMARY OF THE INVENTION

The method and system of the invention described herein enables a seller to increase the value and utility of one or a plurality of data items by pairing them with observations and placing them into a format specified by a buyer. The incentive to shape the data is placed on the seller, rather than the buyer, but the buyer is required to provide a sample format for sellers to match as they insert their data item pairs (DIPs) into a form or template for exchanging, uploading or streaming data with necessary and sufficient information to enable the purchaser to link the data item pairs (DIPs) into a federated dataset or aggregate them into a database. Enabling a pricing adjustment for DIPs based upon compatibility with the requirements or specifications of a data purchaser is part and parcel of the method and system.

The process and sequence enabling these actions by buyers and sellers of data item pairs follows: The system facilitates posting a form onto a server or electronic device of a first user to accept input by a second user, said form listing specifications indicating one or a plurality of prices dependent upon the match between data item pair specifications and the one or a plurality of data item pairs; each data item pair comprised of a data item that has a specified label and data type which is a target or recipient of a second data item which is an observation also having a specified label and data type; posting the form on the Internet in a format parsable and discoverable by one or a plurality of search engines; posting a link or a plurality of links within the form to connect to the server or electronic device of the first user by a second user; accepting into the form postings by a second user of one or a plurality of descriptions of one or a plurality of data item pairs; evaluating by the first user or implementing on the server or electronic device of the first user computer readable code to assess the match of the specified labels and data types of the one or a plurality of data item pairs posted into the form by the second user; posting into the form by the first user or through manual input or through implementation of computer readable code on the server or electronic device of the first user an indication and count of the one or a plurality of data item pairs that match the specifications by the first user; accepting into a form an indication of acceptance of the suitability of one or a plurality of data item pairs specified by the first user; accepting into a form a disconfirmation of acceptance of one or a plurality of data item pairs specified by the first user; sending a notification by the first user through computer readable code on the server or electronic device of the first user to the server of the electronic device of the second user indicating which of the one or a plurality of data item pairs are acceptable to the first user; sending a notification by the first user through computer readable code on the server or electronic device of the first user to the server or electronic device of the second user indicating the price offered for the one or a plurality of data item pairs or accepting input from the second user of a counteroffer of a price for the one or a plurality of data item pairs; accepting into the form by the first user or through computer readable code executed on the first server to post to the form an indication of acceptance of an offer price or an indication of a counteroffer price for the one or a plurality of data item pairs; enabling the second user of the server or electronic device to indicate on the form the acceptance of the price for the one or a plurality of priced data item pairs; enabling the first user to insert an indication of confirmation of the price for the one or a plurality of data item pairs.

Additionally, the system facilitates: inserting into a form on the server of the first user one or a plurality of sets of instructions for processing or re-labeling or reformatting data item pairs on the server or electronic device of the second user.

Additionally, the system facilitates: inserting into a form on the server of the first user one or a plurality of sets of instructions for scheduling uploading to the server or electronic device of the first user the one or a plurality of data item pairs indicated in the pricing agreement.

Additionally, the system facilitates: the server or electronic device of the first user initiates an email to the second user, wherein the email comprises a web link that when executed launches computer readable code to enable data item pair matching.

Additionally, the system facilitates: computer readable code further specifies a server or electronic device to receive the data item pairs from the second user.

Additionally, the system facilitates: the first user may execute computer readable code to apply a rule engine that comprises identifying at least one data item pair, wherein said data item pair is representative of at least one or a plurality of data item pairs matched to the data item pair description in the form.

Additionally, the system facilitates: translating one or a plurality of data item pairs to a second format using computer readable code to implement the conversion.

Additionally, the system facilitates: the second user may accept computer readable code to automatically upload changes in data item pairs according to a schedule or in response to a real time change in one or a plurality of data item pairs indicated in the pricing agreement to the server or electronic device of the first user from the server or electronic device of the second user.

Additionally, the system facilitates: the computer readable code further specifies a date or schedule for the data item pair transfer.

Additionally, the system facilitates: computer readable code may adjust prices according to intervening criteria such as the volume of the data item pairs or the creation date of one of the data items of the one or a plurality of data item pairs set by the first user.

In another embodiment, the system implements a method for generating a query to retrieve multiple data item pairs in one access operation, comprising the steps of: providing a first user identifier and a second user identifier for each data item pair or a plurality of data item pairs, wherein the related data item pair or a plurality of data item pairs are related to the second user; declaring a specification for which data item pairs or a plurality of data items pairs are going to be retrieved and how the second user and data item pairs being retrieved relate to each other; generating a data item pair identifier comprising the following: (1) a relationship indicator that represents how the one or a plurality of data item pairs relate to the second user, (2) a unique name for each data item pair, (3) an identifier generated by the first user of the server that is retrieving the one or a plurality of data item pairs, and (4) a label indicating the class or group assignment in a federated or aggregated dataset on the server or electronic device of the first user; loading the one data item pair or a plurality of data item pairs into an xml form; sending the xml form to the server or electronic device of the second user, wherein the access query is based on the retrieval specification; receiving from the server a query result, wherein the query result posts a data item pair or a plurality of data item pairs into an xml form for uploading to the server or electronic device of the first user.

Additionally, the system facilitates: the server or electronic device of the first user initiates an email to the second user, wherein the email indicates the data item pair or a plurality of the data item pairs that have been retrieved and the price or value assigned to the transaction.

BRIEF DESCRIPTION OF THE DRAWING

FIG. 1 (Diagram of Event Sequences—Data Item Pair Creation, Comparison, Price Acceptance and Enabling Trading) is an example of steps and processes by the First and Second User to implement the invention.

DETAILED DESCRIPTION OF THE INVENTION

Value and pricing for a dataset or a data field may increase or decrease depending upon many variables. Smith (Ser. No. 12/930,280) of which this patent is a Continuation in Part teaches some of the variables for pricing data, but does not present a system or method to enable pricing for a stream or set of data items formatted specifically to meet the minimal specifications of a buyer of data items. Some buyers of data choose to purchase only items that are of value to them rather than an entire dataset. Some sellers of data would, if they could, choose to sell only a subset of data items from a dataset. Changing the method of exchange for data from one of databases or datasets to the smallest unit or plurality of units for data utilization enables both buyers and sellers to bypass the need for translation, sometimes called "data wrangling" of a dataset and makes trading of data by the data field or data item a more accurate reflection of the cost/benefit equation for both buyers and sellers. The buyer buys exactly according to specification. Data collected or owned by a seller can therefore be leveraged for maximum value in a sale to a data warehouse, aggregator, federator, reseller, or broker.

The system and method herein encourages and supports a market for data trading and exchange across electronic devices with diverse operating systems and housing diverse data structures. The invention described herein is a Continuation in Part of Smith (Ser. No. 12/930,280) which advances the art of methods and systems to create a market for data exchange in a way similar to any market for any other commodity; where buyers and sellers can come together, determine fair pricing, and engage in commercial transactions.

The invention relates generally to pricing data based upon the seller of the data extracting what we suggest be named a DATA ITEM PAIR or "DIP" in which the first member is usually a data item that is the target or subject or topic for observations, and the second member is usually the data item that constitutes the observation upon the target item. While these may be reversed in some embodiments, the pairing will always hold. DIPs may be extracted from any dataset and converted according to specifications of the purchaser of the DIPs. The system and method enable both the seller and the purchaser of data to be assured the degree to which data may be seamlessly aggregated or federated, and to adjust their pricing accordingly. The invention provides systems and methods to configure, communicate, process, and confirm data typing and formatting in order to maximize the value and/or utility of the transferred data.

Data collected and formatted through electronic devices with value to a data warehouse, a data federator, a data aggregator, or a researcher may not have been formatted to facilitate selling or redistributing or reassigning their data, and their data may not conform to requirements of a prospective purchaser. Some accumulators and creators of data keep data housed and formatted within a variety of "off the shelf" branded products like Microsoft Excel or in public domain formats such as CSV files or in simple data tables created through word processors. Some accumulators and creators of data use SQL oriented databases such as MSSQL and MySQL and ProSQL and others. Other accumulators and creators of data are tied into enterprise database systems such as Oracle or SAP or SAS, and their data is structured and formatted according to protocols that are unique to each of the enterprise systems. With the advent of the use of what is currently called the "Cloud" for drawing down documents and spreadsheets within applications such as Google Docs, another layer of potential incompatibility of data storage formats is emerging where data on local devices may not match up with the structure of the data created using an application housed in the "Cloud."

The advent of XML and other variants of markup languages has enabled those who process and manage data to enable data to carry markers and descriptions of the data that can be parsed with standard parsers and converted to a standard Document Object Model (DOM), which can then be processed through standard application programming interfaces. This internal representation of an XML document allows a document to be accessed in the same way by different applications running on different computer platforms. An impetus for the development of XML was to facilitate standard descriptions of data items and many enterprise databases will include computer readable code to enable users to export data into an alternative format, such as XML, because these formats are readable and importable into other databases and can ease data federation or aggregation. XML has already gained significant acceptance within e-commerce, industry, and certain science disciplines as a data standard for interfacing between computer applications. This is due in large part to the XML standard including specifications of how an XML document should be parsed and represented within any computer, irrespective of architecture or operating system. Davis (U.S. Pat. No. 7,953,696) has taught a method to leverage the capability of XML to synchronize data across data users by the XML tags associated with the data. Davis's (U.S. Pat. No. 7,953,696) method assumes that the document or data store being accessed is shared among the users and does not relate to pricing or data exchange. The method taught in the invention described herein teaches new art for pricing and does not claim art teaching synchronization of XML tags. XML parsers are readily available for incorporation into application software in all major programming languages. NASA (National Aeronautics and Space Administration) has introduced and advocated for an extension of XML they call "XDF" to enable more extensive definitions of data and meta-data. Until XML or XDF become an intrinsic and pervasive standard for entry and storage of data across databases, those who wish to exchange data will need other vehicles and methods. Additionally, XML and XDF are focused at the structure of an entire set of data items within a database, not only the attributes of specific data items; whereas buyers and sellers of data may be focused on as little as one data item pair. It is also possible that competing standards for markup languages will emerge, creating an even more pressing need for buyers and sellers of data to have a method and system to bypass a standard if it is beneficial to one or both parties to a data exchange transaction.

Excellent art has been developed for the semantic web that is commonly called "RDF" or Resource Description Framework. RDF sets specifications for what are called "triples." Triples are subject-predicate-object expressions with the subject denoting a resource, a predicate both denoting a trait or aspect of the resource and defining the relationship between the subject and the object. RDF is excellent for representing data, but is tied to a formal language for use by or through computer readable code and therefore requires conversion of a dataset into an appropriate format for the semantic web. It functions similarly to XML, where the producer of the data has to engage in complex operations and formulations that require specialized knowledge and resources. Embodiments of this invention may well extract DIPs from RDF constructions or XML or other data tagging and configuration schemata, using them as sources for DIP construction, just as any table or dataset or database may be used as a source for DIP construction. The patent described herein does not preclude the implementation or use of any schema such as XML or XDF or RDF for structuring or parsing or tagging data. Rather it is intended to leverage the capabilities of any schema through conversion into one or a plurality of Data Item Pairs or "DIPs."

It may be common for those who create, accumulate, enter, and store data to use compatible or matched XML or RDF or other schemata to tag the data and store it according to specifications, but there is no method or system other than the invention described herein that teaches that the value of the data items within the matched schemata can be proportioned or adjusted according to the compatibility with specifications of a prospective purchaser of the data. Further, those who create, accumulate, enter and store data may simply accept the formatting schemata already used by their enterprise database systems or their software applications and store their data items in formats that are incompatible with an XML or any other schema without a translation utility of computer readable code being applied to the items to make them compatible with the specifications of a data purchaser. Software tools or middleware such as Data Wrangler from Stanford University and Data Refiner from Google are readily available to owners of data to reformat and reshape data according to specifications requested by a data buyer. The method of the invention described herein leverages two attributes associated with a data item; an item label or object name and a data type. The author of an article in Wikipedia states: "Almost all programming languages explicitly include the notion of data type, though different languages may use different terminology. Common data types may include:

integers,
  booleans,
  characters,
  floating-point numbers,
  alphanumeric strings.

For example, in the Java programming language, the 'int' type represents the set of 32-bit integers ranging in value from −2,147,483,648 to 2,147,483,647, as well as the operations that can be performed on integers, such as addition, subtraction, and multiplication . . . . A data type also represents a constraint placed upon the interpretation of data in a type system, describing representation, interpretation and structure of values or objects stored in computer memory. The type system uses data type information to check correctness of computer programs that access or manipulate the data."

If a database object is extracted from a database for posting to a second database that shares the same item label or object name and data type, it can be seamlessly posted to the second database. RDF is an example of an intervening linking process that can make data compatible, as is XML. Smith (U.S. Pat. No. 7,860,760) teaches that data may be sent in a string of items from one user to another user, and indicates that data must be compatible with specifications of the purchaser, but does not teach a system or method for enabling compatibility of the data items. Smith (U.S. Pat. No. 7,860,760) further teaches that data items that are associated with triggers and other actions may be assigned a value and a price. However, Smith (U.S. Pat. No. 7,860,760) does not specify a system or method to adjust the value of the data item according to its immediate compatibility with the data format or dataset structure desired by the buyer of a data item.

Another response to the data compatibility issue; indeed an obvious response, is to draw data only from datasets or databases that are identical in format and structure. In this way, data from a SAS or Oracle or other database or XML or file structure is joined or merged into a database or file structure with exactly the same format and structure. While this would seem to work easily, labels or object names for items, even if the back end database is the same across all included datasets, will often be out of kilter, resulting in garbled datasets when these are federated or merged.

Another response to the problem of compatibility of data items for posting into a data structure is to force the person or device creating or entering data to draw from a "parent" or master set of labels for columns or rows as data entries are created in a subsidiary or "child" dataset. The parent and child datasets are then synchronized to create the federated dataset. This system and method is taught by Smith (Ser. No. 12/932/798) using a publisher/parent database and an infinitely expandable set of subscriber/child databases that are synchronized periodically or in real time to maintain both versioning and compatibility of data and data formats. Others have also taught variants of this art for synchronization. The disadvantage of this method is that users must use the system and method to build data structuring and data collection protocols using computer readable code in a software application on an electronic device in order for the publisher/subscriber or parent/child database system and method to be synchronized prior to collecting or entering data. Use of the Resource Description Framework can also be applied to the problem of data compatibility. Smith (Ser. No. 12/932/798) teaches a hybrid of the enterprise database and data tags, but does not sufficiently address the labeling or object naming and typing of data items according to specifications for data structures or databases independent of the publisher and subscriber database model.

A non-obvious method and system of the invention taught herein is to enable a potential buyer or seller of a data item or a plurality of data items to post a description of his data item pairs or "DIPs" into a sale or purchase offer communicated via electronic devices acting as servers or terminals. Both buyers and sellers can then agree on the format for the DIPs as part of the acceptance of terms and processes or methods to be used for the exchange. Upon acceptance of terms for buying and selling of the DIPs, a manual process or computer readable code may be implemented on a server or electronic device linked or associated with the seller of the data to enable the seller of the data to construct the DIPs to be uploaded to the server or terminal or electronic device of the buyer of the data.

The drawing labeled FIG. 1 is intended to demonstrate how an embodiment of the invention may be illustrated. The contents of the drawing follow in the order they appear in the FIGURE.

1. First User Data Item Pair Definition
   Build table or form of Data Item Pairs:
   First item name
   First item data type
   Second item name
   Second item data type
   Assign name for Data Item Pair
   Set value or price for Data Item Pair
   Post to Data Request Form
2. First User posts table or form to linkable interface to Internet or Web or Email accessible to First and Second User.
3. Second User accesses table of form of Data Item Pairs using Internet or Web or Email accessible to First and Second User.
4. Second User Data Item Pair Matching
   Match Data Item Pairs:
   First item name
   First item data type
   Second item name
   Second item data type
   Check name for Data Item Pair
   Accept value or price for Data Item Pair or insert counter price
5. Second User Posts to Data Request Form using Internet or Web or Email accessible to First and Second User.
6. First User reviews and confirms Data Item Pair Matches using Internet or Web or Email accessible to First and Second User.
7. Second User confirms terms and accepts computer readable code using Internet or Web or Email accessible to First and Second User.
8. First User confirms Second User acceptance and inserts or enables computer readable code on first or second user's server or electronic device using Internet or Web or Email accessible to First and Second User.

A typical embodiment of the invention would have a data warehouse, federator, aggregator, broker, reseller, or researcher specify one or a plurality of DIPs being sought for purchase and provide templates and instructions for manual formatting or provide computer readable code, often called a "utility," to enable the seller to format the DIP according to the buyer's specifications. If there is prior agreement on the use of XML tags or other tags from alternate markup languages, and the data are already compatible, the seller and the buyer will still engage in a process of coming to agreement on a price for the one or a plurality of DIPs embedded within the XML schema or other tags from other markup languages according the method and system of the invention described herein. The same set of agreements as would apply to XML may also be made in regard to files that are shaped through applying the Resource Description Framework.

The data federator may, in one embodiment of the invention, be offered access to the server or electronic device associated with the seller of the data to engage in a manual process or run computer readable code on the server or electronic device to retag or re-label or reassign data object names, or retype data items.

Another embodiment of the invention enables one or a plurality of intermediate steps to be initiated by the owner of the data to do partial re-labeling or conversion of data items into transitional data structures and formats such as XML or XDF or RDF that are then uploaded by the buyer and priced according to the degree of compatibility with the specifications within the agreement for the one or a plurality of DIPs. Another embodiment of the invention enables an intermediate step prior to the agreement for purchase or sale of data. In this embodiment, the seller of the data provides an example from the dataset in the current format for the one or a plurality of DIPs for the buyer to evaluate prior to the exchange.

The practical process for the method and system for the patent described herein is for the seller or the buyer to post the one or a plurality of DIPs they want to buy or sell. The buyer or the seller reviews the one or a plurality of DIPs and confirms that they would like to buy or sell one or more. This can be a simple as checking the row name and the column name in a table and verifying whether the names and data types match the request. If the name or the data type need to be adjusted locally in some fashion to make the match precise, this can be done manually or through running computer readable code. An exchange enabling confirmation of pricing and DIP matches can then proceed and the exchange structured and implemented. It is the DIP that is the unit to be evaluated and priced.

Many other embodiments are possible for one skilled in the art to evolve. The drawing and the explanation above are intended to be illustrative of options for alternative embodiments, not definitive or exclusive or exhaustive.

What is claimed is:

1. A method comprising:
posting a form onto a server or electronic device of a first user to accept input from a second user, said form listing one or a plurality of specifications for one or a plurality of data item pairs and containing one or a plurality of links to enable a connection to said electronic device originating said form, each data item pair comprising a first data item of a specified label and a data type to be matched with a second data item, said second data item comprising an observation upon said first data item;
posting said form in a format parsable by one or a plurality of search engines;
accepting selection of said one or a plurality of links within said form to connect back to said originating electronic device;
accepting via said one or a plurality of links within said form postings from said second user of one or a plurality of specifications for one or a plurality of data item pairs;
implementing on said electronic device of said first user computer readable code to match said one or plurality of specifications of said second user for said one or a plurality of data item pairs;
posting into said form through implementation of computer readable code on said electronic device of said first user an indication and count of said one or a plurality of data item pairs that match said one or a plurality of specifications of said second user;
accepting into said form from said first user an offer price for said one or a plurality of data item pairs;
accepting into said form from said second user an acceptance of said offer price for said one or a plurality of data item pairs specified by said second user; and processing through computer readable code executed on said electronic device of said first user exchange for said one or a plurality of data item pairs confirmed by said second user; and
enabling transfer of said one or a plurality of data item pairs from said electronic device of said first user to said electronic device of said second user.

2. The method of claim 1, accepting into said form on said server of said first user one or a plurality of sets of instructions for processing or re-labeling or reformatting data item pairs from the second user prior to transmission.

3. The method of claim 1, inserting into a form on said server of said first user one or a plurality of sets of instructions to schedule uploading to said server or electronic device of said second user said one or a plurality of data item pairs indicated in the pricing agreement.

4. The method of claim 1, wherein said server or electronic device of said first user or said second user initiates an email, wherein the email contains a link that when executed connects said electronic device of said first user to said electronic device of said second user to launch computer readable code to enable data item pair matching.

5. The method of claim 4, wherein computer readable code further specifies an alternate server or electronic device to receive transmission of one or a plurality of data item pairs.

6. The method of claim 4, wherein said first user may execute computer readable code to apply a rule engine to identify at least one data item pair, wherein said data item pair is representative of at least one or a plurality of data item pairs matched to said data item pair specifications of said second user, and where a new observation portion of a data item pair within a date range is posted into a notification transmitted to said second user with links for said user to indicate continued acceptance of said agreed offer price and process for exchange of said data item pairs.

7. The method of claim 4, wherein said first user may implement computer readable code to translate said one or a plurality of data item pairs to an alternate data structure.

8. The method of claim 4, wherein said first user may accept computer readable code to automatically transmit changes in data item pairs according to a schedule or in response to a real time change in one or a plurality of data item pairs indicated in said pricing agreement.

9. The method of claim 4, wherein said computer readable code further specifies a date or schedule for transfer of one or a plurality of data item pairs.

10. The method of claim 4, wherein computer readable code may adjust prices according to additional criteria agreed to by said first and second user, said criteria including, but not limited to a quantity of prior traded data item pairs and a creation date of said one of the data items comprising said one or a plurality of data item pairs.

* * * * *